United States Patent [19]

Diepold-Scharnitzky

[11] 4,399,709
[45] Aug. 23, 1983

[54] FLOW METER

[75] Inventor: Rudolf Diepold-Scharnitzky, Berlin, Fed. Rep. of Germany

[73] Assignee: Siemens Aktiengesellschaft, Munich, Fed. Rep. of Germany

[21] Appl. No.: 237,517

[22] Filed: Feb. 23, 1981

[30] Foreign Application Priority Data

Feb. 29, 1980 [DE] Fed. Rep. of Germany ....... 3008248

[51] Int. Cl.³ ............................................. G01F 3/08
[52] U.S. Cl. ................................... 73/861.77; 73/253
[58] Field of Search ............... 73/861.77, 861.78, 253, 73/254, 235–261; 324/174; 235/92 ST, 92 FL

[56] References Cited

U.S. PATENT DOCUMENTS 2,859,616  11/1958  Fellows ................................. 73/195
3,792,610  12/1974  Kountanis ........................ 73/861.77
3,874,235   4/1975  Sanden ................................... 73/253
3,996,800  12/1976  Rosso ............................... 73/861.78
4,061,901  12/1977  Saunders et al. ..................... 235/92
4,345,480   8/1982  Basham et al. ................... 73/861.77

Primary Examiner—Herbert Goldstein
Attorney, Agent, or Firm—Kenyon & Kenyon

[57] ABSTRACT

A flow meter is disclosed which comprises a rotary piston carrying at least one magnet, and a measuring transducer. The transducer comprises a multiplicity of magnetic field-sensitive components arranged in correspondence with the path of motion of the magnet. The magnetic field-sensitive components are arranged in groups which are coupled to a respective pulse edge-sensitive circuit such as a monostable multivibrator. The flow meter of the invention is particularly applicable as a liquid flow meter for foods.

9 Claims, 2 Drawing Figures

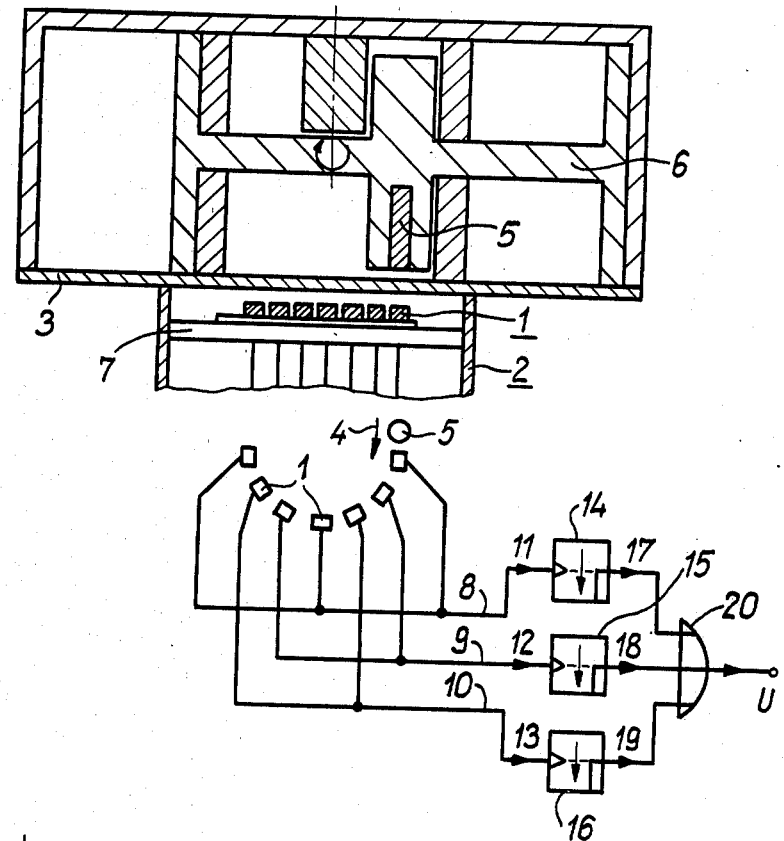
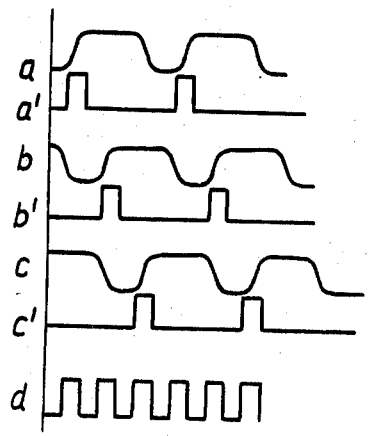

FLOW METER

BACKGROUND OF THE INVENTION

The present invention relates to a liquid or gas flow meter which includes a rotary piston carrying at least one magnet, and a magnetic transducer.

In a known flow meter (see for example U.S. Pat. No. 3,874,235) which comprises a rotary piston carrying a magnet and a magnetic transducer, the magnetic field-sensitive parts are arranged at the center of the path of motion of the exciter magnet and are provided with U-shaped magnetic conductor strips for guiding the magnetic field lines, the poles of which are diametrically opposite each other in the path of motion. To increase measuring accuracy, several poles are provided in this type of flow meter. However, the central arrangement of the magnetic field-sensitive parts at the center of the path of motion and the relatively large dimensions of the poles and the magnetic conductor strips require narrow tolerance limits in order to increase measuring accuracy for reasons of space. If relatively numerous, closely adjacent poles are arranged, there is a further danger of spuriously generated signals by the magnetic field-sensitive parts.

OBJECT AND SUMMARY OF THE INVENTION

Objects of the present invention are to increase the measuring accuracy and resolution of a flow meter while avoiding measuring errors due to spuriously generated signals by the magnetic field-sensitive parts.

According to the invention, a multiplicity of magnetic field-sensitive components is provided in a flow meter comprising a rotary piston carrying a magnet, and a magnetic transducer. The transducer includes magnetic field-sensitive components arranged to correspond to the path of motion of the magnet. The outputs of the magnetic field-sensitive components are coupled to electric pulse edge-responsive circuits which generate an electric output pulse of relatively short width in response to a leading (positive) or trailing (negative) edge of an input pulse. The components are sequentially arranged so that the pulses they generate follow each other in sequence.

Arranging a multiplicity of magnetic field-sensitive components according to the invention can increase the resolution and thereby the measuring accuracy of the flow meter without increasing measuring errors due to spurious signals. According to the invention, any deleterious effect of an overlap of adjacently generated pulses is eliminated and such overlap is not detrimental to resolution since only the leading or trailing edge of the output signals of the magnetic field-sensitive components are used. The magnetic field-sensitive components can therefore be arranged directly adjacent to each other according to the path of motion of the magnet. Since only one magnetic field-sensitive component generates a pulse of relatively short pulse width at any one time, measuring errors due to spurious signals are prevented.

To each magnetic component, an electric edge-responsive circuit or module can be assigned and each electric circuit can be identical.

To decrease the amount of circuitry, the magnetic field-sensitive components can advantageously be combined in groups; non-adjacent magnetic field-sensitive components spaced, for example, by an equal number of magnetic field sensitive components, can be connected together, the number of groups determining which components are connected together and the spacing between components which are connected together.

For evaluating the electric pulses, the outputs of the electric circuits can advantageously be coupled to an OR gate and thereby interlinked, so that at the output of the OR gate, a signal is available which can be fed to a counting device.

According to one aspect of the invention, the measuring accuracy of the flow meter can be increased still further by choosing the spacings between adjacent magnetic field-sensitive components along the path of motion so that the same width is assigned to each pulse to compensate for flow meter system errors. For example, system errors caused by the non-linear relationship of the liquid or gas flowing through the meter and the angle of rotation of the rotary piston can be compensated by a suitable arrangement of the magnetic field-sensitive components. With such an arrangement, the number of the electric pulses is proportional to the volume of the liquid or gas flowing through the flow meter.

According to another aspect of the invention, there can advantageously be provided on the side of the magnetic field-sensitive components facing away from the magnet, a plate which is highly magnetically conductive and has a flat surface which is perpendicular to the axis of polarization of the magnet carried by the piston. The arrangement of the highly magnetically conducting plate at the magnetic field-sensitive components advantageously provides a concentration of the magnetic field of the magnet in the vicinity of the magnetic field-sensitive components so that the reliability of the response of the magnetic field-sensitive components and thereby the measuring accuracy of the flow meter can be increased.

According to still another aspect of the invention, the magnetic field-sensitive components in the flow meter according to the invention can advantageously be Hall switches which comprises a Hall probe and an integrated switching amplifier.

Due to the small dimensions of the Hall switches, which contain an extremely magnetic field-sensitive Hall probe, a large number of magnetic field-sensitive components can be arranged in the path of motion of the magnet. In addition, the integrated switching amplifier ensures that the output signal of the Hall switch, which is fed to the electric circuits, is of adaquate magnitude.

More particularly, a flow meter according to the invention comprises a piston rotatably mounted in the flow meter, at least one magnet carried by the piston, and a measuring transducer arranged adjacent to the piston and comprising a plurality of magnetic field-sensitive components arranged in correspondence with the path of motion of the magnet carried by the piston so as to be sequentially sensitive to the field of the magnet as the piston rotates. Each magnetic field sensitive component is operative to generate a pulse as the magnet is carried past the respective magnetic field-sensitive component. Means are coupled to the magnetic field-sensitive components for generating pulses of relatively short duration in response to an edge of the pulses generated by the magnetic field-sensitive components.

The pulse generating means comprises an electric pulse edge-sensitive circuit coupled to each magnetic field-sensitive component. Non-adjacent magnetic field sensitive components are coupled together according to a predetermined order to arrange the magnetic field-sensitive components in groups, an electric circuit being coupled to each of the groups.

In a disclosed embodiment, the magnetic field-sensitive components are disposed in numerical order corresponding to the path of motion of the magnet. A first and fourth of the field-sensitive components are coupled together, a second and a fifth of the magnetic field-sensitive components are coupled together, and a third and a sixth of the magnetic field-sensitive components are coupled together. A seventh of the magnetic field sensitive components is coupled to the first and fourth, an eighth to the second and fifth, a ninth to the third and sixth, and so on.

The field-sensitive components are spaced along the path of motion of the magnet to provide pulses generated by the magnetic field-sensitive components of equal width, whereby system errors tending to give unequal pulse widths can be compensated.

These and other aspects of the invention will be more apparent from the following description of the preferred embodiment thereof when considered with the accompanying drawings and appended claims.

BRIEF DESCRIPTION OF THE DRAWINGS

The present invention is illustrated by way of example and not limitation in the figures of the accompanying drawings in which like references indicate similar parts and in which:

FIG. 1 is a cross-section view of part of a flow meter according to an embodiment of the invention and a schematic wiring diagram of the magnetic field-sensitive components, the monostable multivibrators and the OR circuit of the embodiment; and FIG. 2 is a waveform diagram of pulses generated by the magnetic field-sensitive components, the multivibrators and the OR circuit of FIG. 1.

DESCRIPTION OF THE PREFERRED EMBODIMENT

In the flow meter shown in FIG. 1, the magnetic field-sensitive components 1 form part of a measuring transducer 2 which is disposed adjacent to a fixed wall 3 of the flow meter. The magnetic field-sensitive components 1 are positioned along a curve in correspondence with the path of motion 4 of a magnet 5 mounted on a rotary piston 6 of the flow meter. On the side of the components 1 facing away from the magnet 5, a highly magnetically conductive plate 7 is disposed. The magnetically field-sensitive components 1, which in the preferred embodiment comprises Hall switches, are combined in groups by connecting the components in a predetermined arrangement. As shown in FIG. 1, the compounds are connected into three groups; thus, the first component is connected to the fourth component, the second to the fifth, the third to the sixth, the seventh to the first and fourth, etc, reference being had to a numerical order starting either from the left side of the components and counting in a counterclockwise direction or from the right side of the components and counting in a clockwise direction. The lines connecting the components and forming the three groups are designated 8, 9, 10.

Lines 8, 9, 10 are connected to the inputs 11, 12, 13 of electric circuits or modules 14, 15, 16 to thereby connect the outputs of respective groups to a respective module. The electric modules 14, 15, 16 in the preferred embodiment comprise monostable multivibrators. The inputs 11, 12 and 13 of the monostable multivibrators are trigger inputs which respond to the respective leading (positive) or trailing (negative) edge of a signal. Pulses of relatively short width are generated at the outputs 17, 18, 19 of the monostable multivibrators 14, 15, 16 in response to the signals (edges) present at the trigger inputs. The duration of the pulses is chosen so that the pulses present at the different outputs occur sequentially. The outputs 17, 18, 19 are connected to respective inputs of an OR gate (circuit) 20. A shaped pulse output signal U is obtained at the output of the OR gate 20 to which may be connected a counter circuit.

The pulse diagram of FIG. 2 shows the output signals a, b, c of the first to third magnetic field-sensitive components, respectively. The pulses a', b', c' represent the relatively short width pulses of the three corresponding monostable multivibrators, where the pulse a' occurs at the time of the leading (positive) edge of the output signal a. The pulses b' and c' occur at the times of the leading edge of the output signals b and c. The pulses d represent the output signal U which is formed in this case from an interlinkage of the pulses a', b', c' by means of the OR gate 20.

The operation of the flow meter according to the invention will now be described. Referring to FIG. 1, the magnet 5 rotates with the rotary piston 6 of the flow meter so that the magnetic field-sensitive components sequentially enter the influence zone of the magnet. At the instant a magnetic field-sensitive component is activated, i.e., during the leading edge of the output signal of the component, the respective electric module connected thereto is trigged and produces at its output an electric pulse of relatively short width. The width of the pulse is selected to be short enough so that the pulse ends prior to the instant at which the magnet 5 activates the next component in the direction of rotation. Optimum resolution during the measuring process is thus assured and inaccurate measurements due to spurious generation of pulses from the magnetic field-sensitive components is prevented.

The advantages of the present invention, as well as certain changes and modifications of the disclosed embodiments thereof, will be readily apparent to those skilled in the art. It is the applicant's intention to cover by his claims all those changes and modifications which could be made to the embodiments of the invention herein chosen for the purpose of the disclosure without departing from the spirit and scope of the invention.

What is claimed is:

1. A flow meter comprising a piston rotatably mounted in the flow meter, at least one magnet carried by the piston, a measuring transducer arranged adjacent to the piston and comprising a plurality of magnetic field-sensitive components arranged in correspondence with the path of motion of the magnet carried by the piston so as to be sequentially sensitive to the field of the magnet as the piston rotates, each magnetic field-sensitive component being operative to generate a pulse as the magnet is carried past the respective magnetic field-sensitive component, non-adjacent magnetic field sensitive components being coupled together according to a predetermined order to arrange the magnetic field-sensitive components in groups, the predetermined order depending on the number of groups, and an electric pulse edge-sensitive circuit coupled to each group of magnetic field-sensitive components for generating a pulse of relatively short duration in response to an edge of each pulse generated by the magnetic field-sensitive components.

2. The flow meter according to claim 1 wherein the magnetic field-sensitive components are disposed in numerical order corresponding to the path of motion of the magnet, the magnetic field sensitive components being connected in three groups, a first and fourth of the field-sensitive components being coupled together, a second and a fifth of the magnetic field-sensitive components being coupled together, and a third and a sixth of the magnetic field-sensitive components being coupled together, and so on.

3. The flow meter according to claim 1 wherein spacings between the magnetic field-sensitive components along the path of motion of the magnet are so chosen that each pulse is proportional to an equal part of the volume flowing through the flow meter.

4. The flow meter according to claim 1 and including a magnetically conductive plate disposed adjacent the magnetic field-sensitive components on the side thereof facing away from the magnet, the plate having a flat surface disposed perpendicularly to the axis of polarization of the magnet.

5. The flow meter according to claim 1 and including an OR circuit, the output of each of said electric circuits being coupled to a respective input of the OR circuit.

6. The flow meter according to claim 1 wherein the magnetic field-sensitive elements comprise Hall switches having a Hall probe and a switching amplifier coupled thereto.

7. The flow meter according to claim 6 wherein the probe and amplifier are integrated.

8. A flow meter comprising a piston rotatably mounted in the flow meter, at least one magnet carried by the piston, a measuring transducer arranged adjacent to the piston and comprising a plurality of magnetic field-sensitive components arranged in correspondence with the path of motion of the magnet carried by the piston so as to be sequentially sensitive to the field of the magnet as the piston rotates, a magnetically conductive plate disposed adjacent the magnetic field-sensitive components on the side thereof facing away from the magnet, the plate having a flat surface disposed perpendicularly to the axis of polarization of the magnet, each magnetic field-sensitive component being operative to generate a pulse as the magnet is carried past the respective magnetic field-sensitive component, and means coupled to the magnetic field-sensitive components for generating pulses of relatively short duration in response to an edge of the pulses generated by the magnetic field-sensitive components.

9. The flow meter according to claim 8 wherein said means comprises an electric pulse edge-sensitive circuit coupled to each magnetic field-sensitive component.

* * * * *